Feb. 19, 1935.   S. H. HOBSON   1,991,503
CLOSED TOP STOVE
Filed June 26, 1931   2 Sheets-Sheet 1
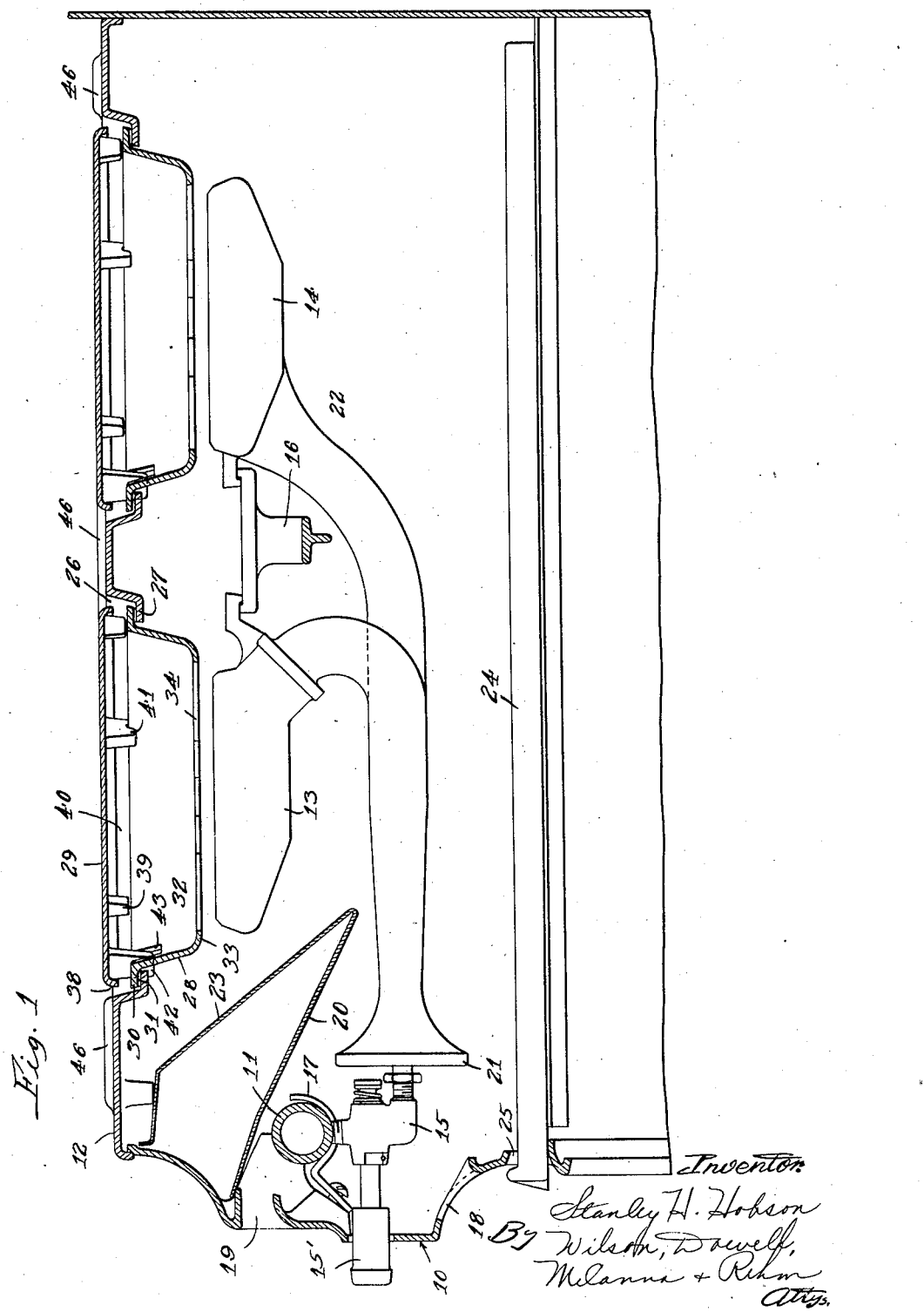

Feb. 19, 1935.　　　S. H. HOBSON　　　1,991,503
CLOSED TOP STOVE
Filed June 26, 1931　　2 Sheets-Sheet 2
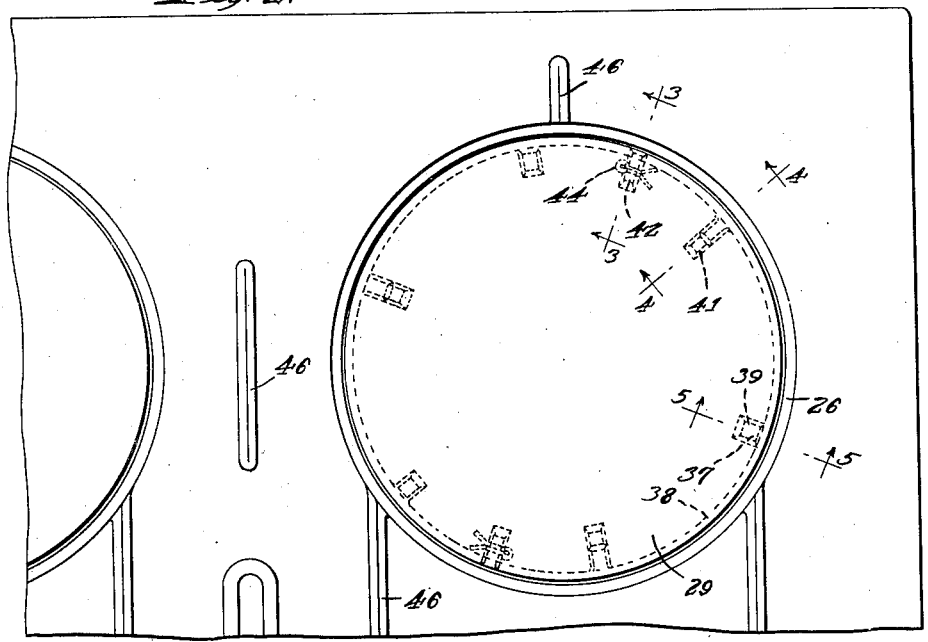
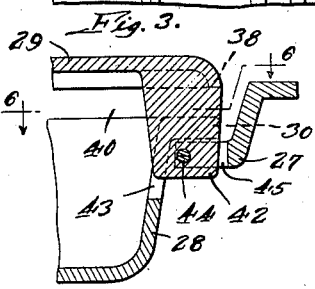
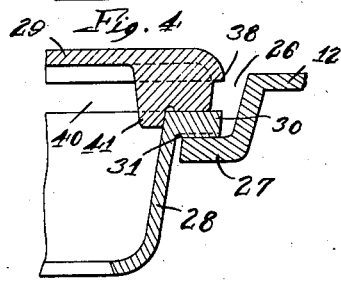
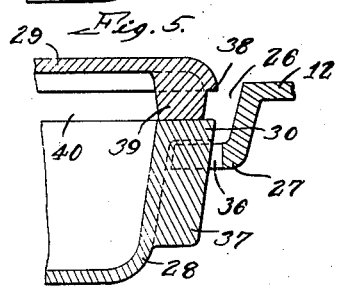
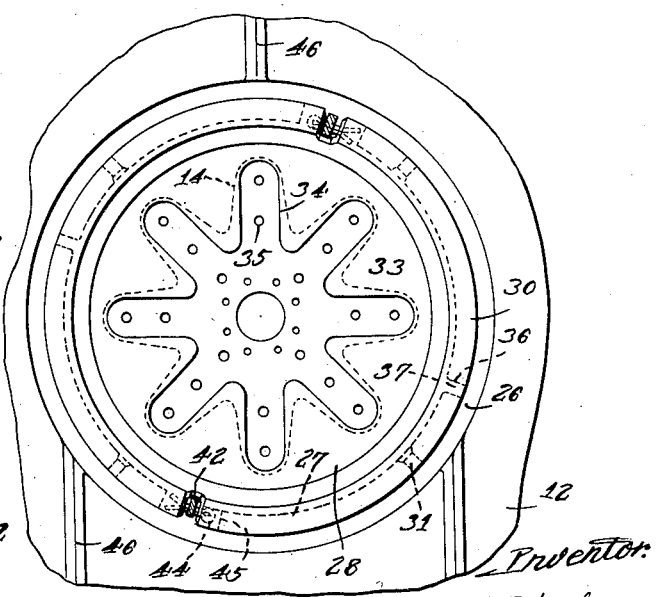
Inventor:
Stanley H. Hobson
By Wilson, Dowell, McCanna & Pelm
Atty.

Patented Feb. 19, 1935

1,991,503

UNITED STATES PATENT OFFICE 1,991,503

CLOSED TOP STOVE

Stanley H. Hobson, Rockford, Ill., assignor to Geo. D. Roper Corporation, Rockford, Ill., a corporation of Illinois Application June 26, 1931, Serial No. 546,937

4 Claims. (Cl. 126—39)

This invention relates to gas ranges, and more particularly closed top stoves.

The principal object of my invention is to provide a closed top stove differing from the conventional type in the provision of means for concentrating the heat over the individual burners and allowing the products of combustion to be vented directly from the cooking top at those points, instead of allowing distribution of heat to the rest of the cooking top in the travel of the products of combustion from the individual burners to a flue outlet. This stove retains most of the advantages of the ordinary closed top stove, and offers the additional advantage of having an efficiency equal to that of an open top stove. Furthermore, the fact that the heat is concentrated over the burners, aside from making for maximum efficiency and less heating of the kitchen makes it possible to enamel the cooking top for better appearance.

My invention, more specifically stated, contemplates the provision of a combustion bowl arranged to fit in the opening in the cooking top with the bottom thereof disposed close to the top of the burner and provided with secondary air openings therein conforming to the arrangement of the flame ports of the burner, whereby to admit the flame to the combustion bowl, and a lid for the opening in the cooking top on which to place the cooking utensil, the same serving to close the top of the bowl except for vents of a fixed size about the periphery thereof and between the lid and cooking top, whereby to allow the products of combustion to escape to the atmosphere, and in so doing, sweep the sides of the utensil for good heating efficiency. With this construction and arrangement, I secure substantially the same efficiency with the lid on as is ordinarily secured in a conventional closed top stove with the lid removed, leaving out of consideration, of course, the increase in efficiency resulting from the concentration of the heat by the combustion bowl, and there are the additional advantages that the escape of products of combustion cannot possibly be shut off or obstructed to such an extent as to give rise to carbon monoxide gas formation, and the cooking top is kept cool enough to permit having the same enameled.

Other objects of my invention, briefly stated, consist in specially forming the lid for good heat transfer to the utensil; specially forming the bowl and lid so as to make for minimum heat transfer by conduction to the cooking top; constructing the bowl and lid for removability thereof as an assembled unit from the opening in the cooking top when access to the burner therebeneath is desired, and the provision of upwardly projecting ribs on the cooking top about the openings therein approximately at the same level as the lids, whereby to enable the sliding of utensils about on the cooking top without damage to the enamel finish, and also prevent the cutting off of escape for the products from the vents when large utensils are placed on the lids and overlapping the cooking top thereabout.

The invention is described in detail hereinafter by reference to the accompanying drawings, in which—

Figure 1 is a longitudinal vertical section through the cooking top section of a gas range embodying my invention;

Fig. 2 is a plan view of a portion of the cooking top;

Figs. 3–5 are enlarged sectional details on the correspondingly numbered lines of Fig. 2, and Fig. 6 is a view similar to Fig. 2, but showing the lid cut away in the plane of the line 6—6 of Fig. 3.

The same reference numerals are applied to corresponding parts throughout the views.

The stove in connection with which I have illustrated my invention, is one having the front 10 thereof concealing the manifold 11, and constructed along the lines disclosed in the copending application of Peter I. Hollman, Serial No. 531,281, filed April 20, 1931. It will soon appear, however, that my invention is applicable to all closed top stoves regardless of whether the same have a concealed or exposed manifold. The cooking top 12 has front burners 13 and rear burners 14 provided therebeneath in communication with cocks 15 depending from the manifold 11. The cocks 15 have knobs 15' projecting through holes in the front 10 for operation thereof. A suitable burner support is shown at 16. The manifold 11 is fastened to the front 10 by means of clips 17, whereby to dispose the cocks between a lower opening 18 for the inlet of air, and an upper opening 19 for the escape of a certain amount of air which, after entry at 18 and circulation past the cocks 15, is deflected upwardly by the baffle 20 and circulated about the manifold 11. Thus, a part of the air entering through the opening 18 is used for cooling of the cocks and manifold, as described in the Hollman application. The rest of the air is divided into primary air entering the shutters 21 of the burners 13 and 14 for mixture with the gas delivered to the burners by the cocks 15, and secondary air to support combustion at the burners in the burner compartment 22. The baffle 20, as described in the Hollman application, is substantially V-shaped in cross-section, whereby to provide a rear wall 23 to deflect the heat of the front burners upwardly away from the manifold and cocks. A drip pan 24 is slidable through an opening 25 in the front 10, and forms the bottom of the burner compartment 22. So much for a general understanding of the stove in connection with which I have illustrated my invention.

In accordance with my invention, the cooking top 12 is provided with openings 26 substantially concentric with the various burners and defined by ledges 27 slightly below the plane of the cooking top. The ledge 27 in each case constitutes a support for a combustion bowl 28 and its associated lid 29. The bowl 28 has a flanged rim 30 resting on the ledge 27 at a plurality of circumferentially spaced points where small downwardly projecting bosses 31 are formed on the rim 30. This is to minimize the transfer of heat from the bowl to the cooking top by conduction and allow circulation of air between the bowl and cooking top for cooling purposes. The projections could, of course, be provided on the ledge 27 instead of on the rim 30 to produce the same result. The bowl is of a predetermined depth so as to provide a combustion chamber 32 therein under the lid 29 of ample size for the purpose intended, and so as to locate the bottom 33 of the bowl at a predetermined elevation with respect to the top of the burner 13 or 14, as the case may be. A star-shaped opening 34 is provided in the bottom 33 conforming to the arrangement of the flame ports 35 in the fingers of the burner so as to admit the flame to the combustion chamber along with enough secondary air from the burner compartment 22 to support combustion, the secondary air being entrained with the gas issuing from the ports 35, by an injector action. One or more notches 36 are provided in the ledge 27 to receive lugs 37 provided on the outside of the bowl 28 under the rim 30, whereby to accurately locate the bowl with its opening 34 in proper relation to the burner, and with the bowl approximately central in the opening 26 so that there is a uniform clearance circumferentially of the bowl between the bowl and the edge of the ledge 27. With this construction, the bowl is arranged to be removed whenever it is desired to have access to the burner, as for example, to facilitate cleaning thereof, and the feature just described eliminates any likelihood of the bowl being replaced with its opening 34 out of alignment with the burner, or with the bowl off center in the opening 26 and relative to the ledge 27. Thus there is always assurance of good circulation of air around the bowl between the bowl and the ledge 27 to keep the ledge cool and minimize transfer of heat from the bowl to the cooking top. The lid 29 is cast quite thin so as to make for good heat transfer to a utensil placed on the smooth top thereof. A downwardly flanged rim 38 is provided on the lid for good appearance and to reinforce the lid so that it has the desired strength despite the thinness thereof. Lugs 39 project downwardly from the lid at circumferentially spaced points along the rim for support of the lid in a predetermined elevated relation to the bowl so that vents 40 are provided for the escape of products of combustion from the chamber 32 under the rim 38 of the lid. Other lugs 41 project downwardly from the lid at the rim thereof and fit inside the bowl at circumferentially spaced points on the rim thereof, whereby to locate the lid in concentric relation to the bowl. Still other lugs 42 project downwardly from the lid at the rim thereof at diametrically opposed points and extend through slots 43 in the rim portion of the bowl, whereby to permit fastening of the lid to the bowl by means of cotter pins 44 entered crosswise through holes in the lugs under the rim 30 of the bowl. Notches 45 are provided in the ledge 27 in proper spaced relation to the notches 36 previously mentioned and wide enough to accommodate the lower ends of the lugs 42 and the cotter pins 44 therein. Thus, the lid is permanently assembled on the bowl for removal and replacement thereof as a unit.

In the operation of a burner, the flame thereof projects through the opening 34 into the combustion chamber 32 in the bowl 28, secondary air being supplied through the opening 34 to support combustion inside the bowl. Complete combustion takes place in the bowl by reason of the ample supply of secondary air and the fact that the products of combustion are allowed to escape freely from the confined combustion chamber through the vents 40 under the rim of the lid 29. The fact that the lid 29 is at a fixed elevation with respect to the rim of the bowl 28 and also at a fixed elevation with respect to the cooking top 12 gives every assurance of good combustion because of the free venting of products of combustion from the bowl around the edges of the lid and between the lid and the cooking top. The elevation of the lid relative to the cooking top is important because it makes it impossible for any vessel of ordinary construction to shut off the escape of products of combustion where the vessel is large enough to overhang the cooking top. Since combustion is complete, there is no carbon monoxide gas produced, and the operation of the stove cannot, therefore, be detrimental to health. The operation, in other words, is similar to that of an open top stove except for the heat concentration over the burner. The fact that the heat is concentrated over the burner instead of having a certain amount of heat lost by distribution to the rest of the cooking top between a given burner and a flue outlet, as in an ordinary closed top stove, results in much higher efficiency. As a matter of fact, a stove of this kind offers the same or even better efficiency than an open top stove, while still retaining most of the advantages of the closed top stoves. Aside from the usual advantages of a closed top stove, such as the facility with which the same may be cleaned, and the fact that cooking utensils can be slid about on the top with such ease, the heat concentration over the burners affords the advantage that the cooking top can be enameled for good appearance, inasmuch as it is no longer subjected to heating, as in the case of the ordinary closed top stove. The high efficiency obtained as a result of the concentration of the heat over the burner is further increased by reason of the thinness of the lids 29, which makes for good heat transfer to the cooking utensil, and also by reason of the venting of the products of combustion around the lid so that they sweep the sides of the utensil placed on the lid. This latter phase brings to mind the effect produced in an ordinary closed top stove when the lid is removed and the utensil placed in or over the opening; the present construction affords the same high heating efficiency with the lid on as is produced in the ordinary closed top stove with the lid removed, not counting, of course, the added efficiency resulting from the heat concentration secured by the present invention. Still further efficiency results from the fact that there is minimum heat loss by conduction from the bowl and lid to the cooking top by reason of the fact that the parts have point contact instead of surface contact, as above described. The lids 29 are preferably specially treated to be rust resistant.

It will be observed that the lids 29 have the tops thereof in a plane at a fixed elevation above the plane of the cooking top 12 and that ribs 46 are cast integral with the cooking top and reaching upwardly therefrom to approximately the same level as the top of the lids. Some of the ribs extend directly from the openings 26, and others are provided at points between the openings. They are all preferably parallel with one another for the sake of appearance. The purpose of these ribs is to enable the sliding of utensils about on the cooking top onto and off the lids with ease and without damage to the enamel finish of the cooking top. These ribs also cooperate with the lids so that when a large utensil is placed on a lid overlapping the cooking top thereabout, any depending rim portion that might otherwise rest flat on the cooking top about the lid and thus cut off the escape of products of combustion through the vents 40 will find support on the ribs and thus allow normal ventilation of the combustion chamber. The ribs may or may not be provided, as desired, and when they are omitted I rely solely upon the proper elevation of the lids 29 with respect to the cooking top to prevent the shutting off of the escape of the products of combustion by vessels resting on the lids and overhanging the cooking top.

It is contemplated that, as a variation of the invention as above described, an open grate could be substituted for each lid 29 whereby to permit of direct and more efficient heating of a utensil placed thereon. This would give the efficiency of an ordinary open top stove increased by reason of the concentration of heat in the bowl 28 directly under the utensil. It is manifest that with the utensil resting on a grate instead of on a lid, there is also better opportunity for the products of combustion to sweep the sides of the utensil, thus further increasing the heating efficiency accordingly.

It is believed the foregoing description conveys a good understanding of all of the objects and advantages of my invention. The following claims have been drawn so as to cover all legitimate modifications and adaptations coming within the spirit and scope of the invention.

I claim:

1. In a gas stove, the combination of a closed cooking top, a burner disposed therebeneath, the top having an opening provided therein directly over and concentric with the burner, there being an annular supporting ledge on said top defining the margin of the opening, and a heat concentrating unit removably supported in said opening on said ledge over but independent of the burner, said unit comprising a combustion bowl having an annular rim resting on said ledge, the bowl depending from the ledge so that the bottom thereof is disposed in spaced relation to the top of the burner, the bottom having an opening provided therein, a utensil support of the same diameter as the annular rim of the bowl extending across the top of the bowl, means on said utensil support and resting on the rim of the bowl to support said utensil support with its top surface at a fixed elevation with respect to the rim of the bowl and the top surface of the cooking top, and means detachably securing the utensil support to the bowl so that the assembly is removable and replaceable as a unit, the utensil support in the operative position of the unit having an annular rim disposed so as to permit the unit to be lifted thereby off the supporting ledge on the cooking top, said bowl serving to prevent products of combustion from being discharged below the cooking top and said utensil support being disposed so as to insure freedom of escape for products of combustion between the rim of the bowl and the utensil support and between the utensil support or utensil thereon and the cooking top.

2. A structure as set forth in claim 1 wherein the burner is star-shaped and the opening in the bowl is likewise star-shaped, the structure including one or more interfitting projections and recesses on the supporting ledge and the heat concentrating unit whereby to insure registration of the opening in the bottom of the bowl with the burner when the unit is removed from the opening and replaced.

3. A gas stove as set forth in claim 1 wherein the bowl has the rim thereof in contact with the cooking top at only a few points on the supporting ledge, whereby to minimize heat transfer from the bowl to the cooking top by conduction and thereby prevent loss of heat from the bowl and maintain the cooking top at a relatively low temperature.

4. A gas stove as set forth in claim 1 wherein the bowl has the rim thereof in contact with the cooking top at only a few points on the supporting ledge, whereby to minimize heat transfer from the bowl to the cooking top by conduction and thereby prevent loss of heat from the bowl and maintain the cooking top at a relatively low temperature, the bowl being disposed in annularly spaced relation to the supporting ledge whereby to permit circulation of air between the bowl and cooking top for cooling purposes.

STANLEY H. HOBSON.